United States Patent [19]

Bryant

[11] 3,828,333
[45] Aug. 6, 1974

[54] PRESSURE SENSING AND INDICATING SYSTEM
[75] Inventor: Paul M. Bryant, Aptos, Calif.
[73] Assignee: International Technical Industries, Santa Cruz, Calif.
[22] Filed: Dec. 16, 1971
[21] Appl. No.: 208,650

[52] U.S. Cl............... 340/236, 73/393, 73/398 R, 174/152 GM, 331/157
[51] Int. Cl. ........................................... G08b 21/00
[58] Field of Search........ 340/236, 244 R, 240, 242, 340/11 R; 174/152 GM; 310/9.1; 73/30, 24, 398 R, 290 V, 393; 331/157

[56] References Cited
UNITED STATES PATENTS
3,168,830  2/1965  Chass............................. 73/398 R
3,229,524  1/1966  Jewell ............................. 73/398 R
3,307,405  3/1967  Stucki............................. 73/398 R
3,691,521  9/1972  Schaefer........................ 340/240 X Primary Examiner—John W. Caldwell
Assistant Examiner—Daniel Myer
Attorney, Agent, or Firm—Paul D. Flehr et al.

[57] ABSTRACT

A pressure sensing and indicating system for use in conjunction with a vessel pressurized to an initial pressure with a fluid medium and operative to sense and signal the pressure within the vessel includes a pair of transducers for compensating for temperature variations.

3 Claims, 15 Drawing Figures

FIG. 11.   D.C. PULSE DRIVER

SENSOR   PEAK DETECTOR   VOLTAGE COMPARATOR

INVENTOR:
PAUL M. BRYANT
BY
John J. Leavitt

INVENTOR:
PAUL M. BRYANT
BY
John J. Leavitt 3,828,333

PRESSURE SENSING AND INDICATING SYSTEM

BACKGROUND OF THE INVENTION

In recent years the incidence of injury to passengers of automobiles involved in head-on and near head-on collisions has become appalling. It is believed by many safety-minded officials that some form of passive restraint is required, operative at the instant of collision, to shield automobile passengers from impacting with the structural interior of the passenger compartment. One such passive restraint presently undergoing development and testing is the so-called "Air-Bag Restraint" taught by U.S. Pat. No. 3,591,201, owned by Eaton, Yale & Towne Inc. In accordance with the system taught by U.S. Pat. No. 3,591,201, a highly pressurized fluid normally contained in a pressure vessel is released to inflate a resilient bag normally folded into the structural interior of the passenger compartment. Inflation is said to be almost instantaneous, with the result that passengers are shielded from impact with the hard, injury-causing structural interior of the passenger compartment by the interposed resilient pillow formed by the inflated bag. After inflation, deflation occurs rapidly and automatically within a predetermined interval. Obviously, such a passive restraint system is dependent for operation on the presence of pressurized fluid in the vessel which normally contains it. Accordingly, it is one of the objects of the present invention to provide a system for sensing the pressure within the pressurized vessel and appropriately signaling quantitatively the level of pressurization therein.

Another object is to provide a pressure sensing system that may be mass produced, resulting in low initial and replacement costs for the system.

In a passive restraint system on which human life may depend, reliability is of paramount importance. Accordingly, it is another object of the invention to provide a pressure sensing system for use in conjunction with such a passive restraint, which is reliable when initially installed, and which retains its reliability for at least the life of the passive restraint system with which it is used.

It is anticipated that automobiles equipped with passive restraints as described above will be found in regions of intense cold as well as in regions of intense heat. Such extremes in temperature will of course have an effect on the fluid within the pressurized vessel, reducing the pressure in very cold climates, and increasing the pressure in very hot climates. It is desirable therefore that a pressure sensing and signaling system be operative throughout a wide range of temperatures. Accordingly, it is a still further object of the invention to provide a pressure sensing system that automatically compensates for variations in pressure caused by variations in temperature.

Because of the presence of repeated bumps and vibration, it is necessary that the pressure sensing transducer unit of the system be of small size and extremely low mass so as to withstand prolonged vibration without deleterious effect. Accordingly, it is another object of the invention to utilize a transducer fabricated from a ferrimagnetic torroidal core approximately 0.050 inches in diameter.

The invention possesses other objects and features of value, some of which, with the foregoing, will be apparent from the following description and the drawings. It is to be understood, however, that the invention is not limited to the embodiment illustrated and described, as it may be embodied in various forms within the scope of the appended claims.

SUMMARY OF THE INVENTION

In terms of broad inclusion, the pressure sensing and signaling system of the invention comprises a pressure sensor circuit having electrical input and output terminals and mounted in association with a pressurized vessel to respond to variations in pressure in the vessel. In a preferred embodiment such pressure sensor circuit may take the form of an exceedingly small, in the order of about 0.050 inches in diameter, torroidal ferrimagnetic core appropriately wound with primary and secondary windings. A drive circuit is provided having its output connected to the input of the pressure sensor circuit and operative to alternately generate positive and negative electrical pulses at the input of the pressure sensor circuit.

In a system where the pressure sensor circuit includes a ferrimagnetic core, the amplitude of the pulses is preferably sufficient to drive the core into a magnetically saturated condition so as to increase the sensitivity and reliability of the sensor circuit. A detector circuit is provided, arranged to receive the output from the pressure sensor circuit and operative to detect the amplitude of the pulses emanating therefrom. Since the amplitude of the output pulses from the pressure sensor circuit will vary in correlation to variations in fluid pressure within the vessel, a voltage comparator circuit is provided operatively associated with the detector circuit and operative to compare the amplitude of pulses emanating from the detector circuit means with a predetermined reference voltage correlated to a predetermined pressure level within the pressurized vessel. Means are provided activated by a reduction in amplitude of the sensed voltage below said predetermined value to warn an observer that the pressure in the vessel has dropped to a level at which proper operation of the passive restraint system would be questionable.

DESCRIPTION OF PREFERRED EMBODIMENT

In terms of greater detail, the pressure sensing and indicating system of the invention comprises (FIG. 1) a pressure sensor circuit 2 enclosed within or associated with the interior of a pressurized vessel 3 so as to be affected by the pressure therewithin. It should be noted that the configuration of the vessel illustrated is figurative and not significant, any desired configuration being appropriate.

Figure 10:
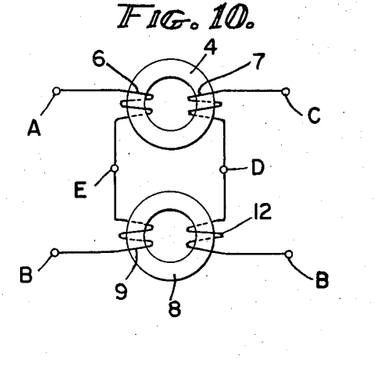
FIG. 10 is an enlarged schematic view illustrating one embodiment of the pressure sensor circuit arranged to provide temperature compensation.

In a preferred embodiment, the pressure sensor circuit 2 includes the components arranged as illustrated in FIG. 10, comprising a first pressure responsive ferrimagnetic torroidal core 4 having primary and secondary windings 6 and 7, respectively, and a second temperature responsive ferrimagnetic torroidal core 8 having primary and secondary windings 9 and 12, respectively. It is important to note that for proper temperature compensation, the windings on cores 4 and 8 are wound in series opposition as shown.

Figure 9:
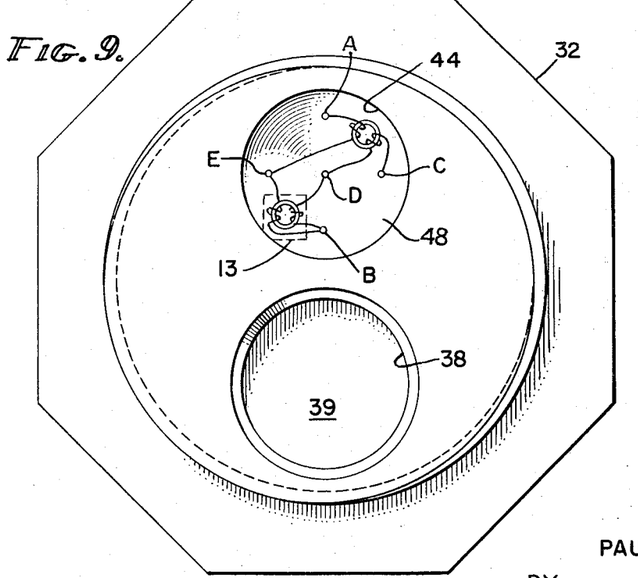
FIG. 9 is an end view of the header illustrated in FIG. 8, taken in the direction of the arrow 9 in FIG. 8.

As illustrated in FIG. 9, in a header having five electrically conductive pins A, B, C, D and E, one terminal end of the primary winding 6 on core 4 is connected to pin A, and the other terminal end of primary winding 6 is connected to pin E. In like manner, the terminal ends of secondary winding 7 are connected to pins C and D. With reference to core 8, it will be seen that opposite terminal ends of the primary winding are connected to pins B and E, and that opposite terminal ends of the secondary winding on core 8 are connected between pins B and D.

For appropriate temperature compensation, the windings on cores 4 and 8 must not only be wound in series opposition as shown, but the core 8 should be shielded from the effects of pressure within the vessel, while being exposed to variations in temperature. This condition is illustrated schematically in FIG. 9 by showing the core 8 confined within an enclosure 13. Another method of achieving such isolation would be to mount the core 8 outside the pressure vessel, while the core 4 is mounted inside the vessel.

Figures 1, 2, 3:
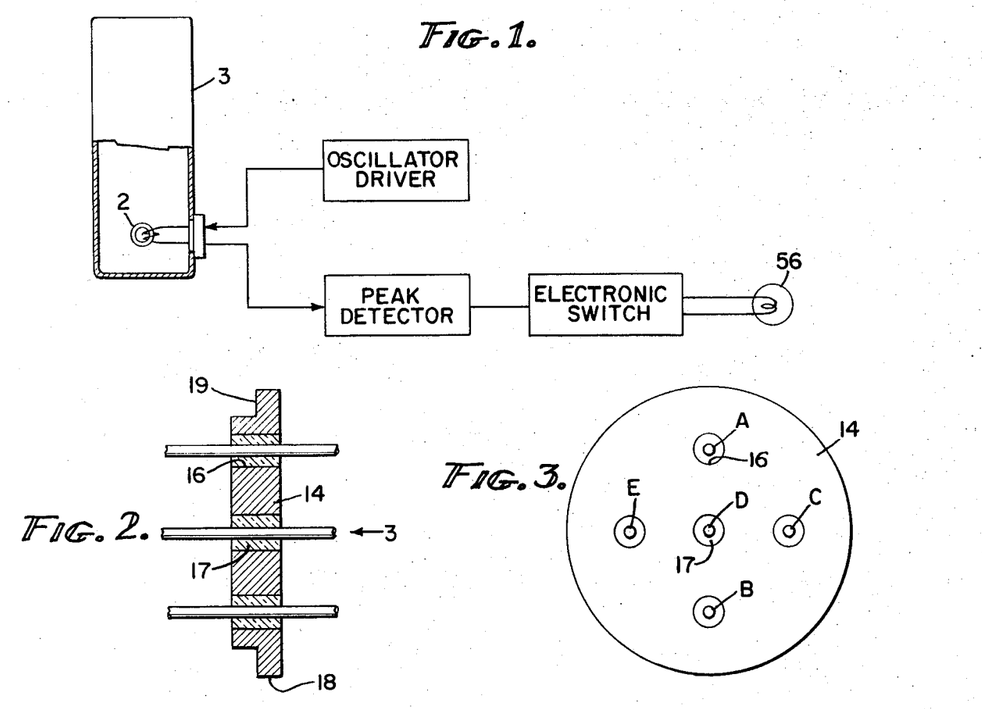
FIG. 1 is a schematic illustration in block diagram form of the pressure sensing and signaling system.
FIG. 2 is a fragmentary view in cross-section illustrating a header for passing electrically insulated leads through the wall of a pressurized vessel.
FIG. 3 is an elevational view of the header illustrated in FIG. 2, taken in the direction of the arrow 3 in FIG. 2.

As illustrated in FIGS. 2 through 7, inclusive, the problem of passing an electrically conductive lead-through or pin through the wall of the vessel 3 may be solved in several different ways. Referring to FIG. 2, there is there shown a metal header plate 14 provided with five bores spaced as shown in FIG. 3. Each of these bores accommodates a glass seal 17, the outer periphery of the glass seal being adherent to the associated bore 16 in a sealing manner. Each of the glass seals 17 surrounds a portion of the associated pin or lead-through so as to electrically insulate the pin or lead-through from the associated header plate. For ease in referring to the various pins, they have been designated by the letters A, B, C, D and E in correlation to the showing illustrated in FIG. 9. The outer peripheral edge 18 of the header 14 may be provided with a rabbet 19 adapted to fit into a corresponding rabbet formed in an aperture in one wall of the vessel. The header is then appropriately welded in the aperture so as to be fluid tight and capable of withstanding the high unit pressures developed inside the vessel.

Figure 4:
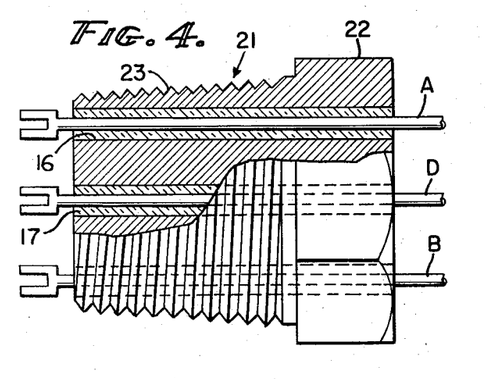
FIGS. 4 and 5 are side and end elevational views, respectively, of a different type header adapted to be threaded into an appropriate bore in the wall of a pressurized vessel.
Figure 5:
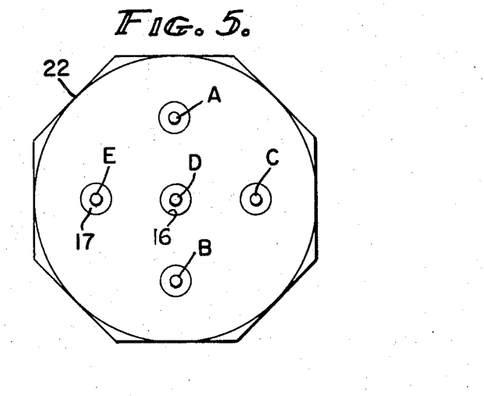

In the header embodiment illustrated in FIGS. 4 and 5, the header comprises an elongated body designated generally by the numeral 21, having a hexagonal head 22 at one end and tapered over a portion 23 of its length adjacent its other end. The tapered end of the body is preferably threaded for engagement with a complimentarily threaded bore in the wall of the vessel. As with the header plate 14, the body 21 is fabricated from an appropriate metal, and the leads A–E extend through the body parallel to the long axis thereof and are insulated from the body by means of a glass seal interposed between each of the pins and the associated bore through the elongated body.

Figure 6:
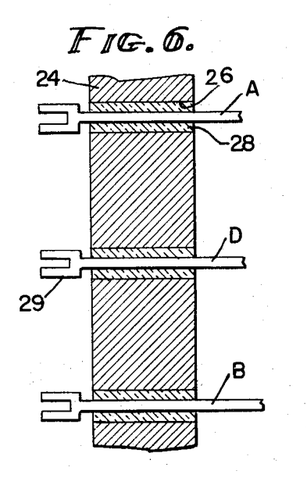
FIGS. 6 and 7 are fragmentary cross-sectional and elevational views, respectively, illustrating a series of electrically insulated leads extending directly through the wall of the pressurized vessel.
Figure 7:
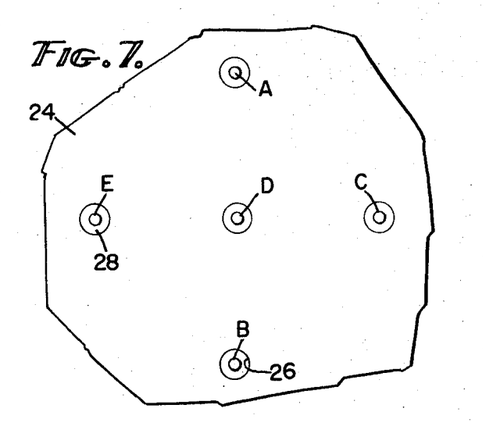

In the embodiment illustrated in FIGS. 6 and 7, there is shown a fragmentary section 24 of the vessel 3 with the wall 24 being bored as at 26 to provide apertures extending therethrough. These apertures receive a glass seal 28 adherent to the inner periphery of each bore and also adherent to the outer periphery of each of the electrically conductive through-pins A–E. The inner ends 29 of the pins may be finished in any convenient manner for facility of mounting or connection of circuit members.

Figure 8:
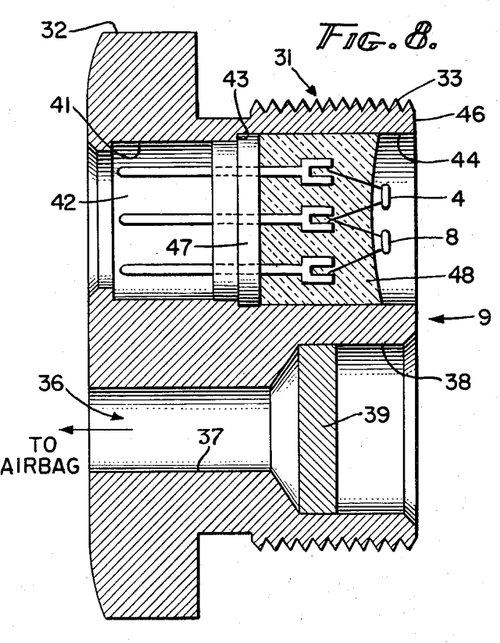
FIG. 8 is an enlarged cross-sectional view of a preferred header embodiment of the threaded type, illustrating the way in which the pressure sensor circuit means are electrically associated with and mechanically supported by the electrically conductive leads passing through the header.

The embodiment illustrated in FIG. 8 is preferred, and as there shown, there is provided a fitting designated generally by the numeral 31, including a hexagonal head portion 32 to which a wrench may be applied, a threaded section 33 adapted to threadably engage a complimentary bore in one wall of the vessel, and provided also with a plurality of bores 34 and 36. The bore 36 includes a reduced in diameter portion 37 communicating with a larger bore 38 within which is disposed a transversely extending diaphram 39. The diaphram is adapted to be ruptured by means energized by the impact of a collision, the energization of such means and the actual rupturing of the diaphram being outside the scope of the present invention.

A bore 34 is provided with a reduced diameter section 41 defining an exterior socket cavity 42 adapted to receive an appropriate connector element between the five electrically conductive lead-throughs A–E and the drive circuit as will hereinafter be explained. The bore 41 is provided with a shoulder 43 and a relatively larger diameter bore 44 defined at one end by the shoulder 43 and at its other end by the inner end portion 46 of the fitting.

Disposed in the bore 42, its peripheral edge portion resting on the shoulder 43, is a header 47 similar in nature to the header 14 illustrated in FIG. 2. Leads A–E extend through the header 47 in the manner previously discussed. It will thus be seen that torroidal ferrimagnetic core members 4 and 8 may be mounted within the bore 44, adjacent the inner end 46 thereof so that the core members are exposed to the pressure within the pressurized vessel. Since each of the core members is small in diameter, being approximately 0.050 inches overall, it is apparent that the windings 6–12 are exceedingly thin and therefore fragile. Accordingly, where desired, a body 48 of potting material may be provided within the bore 44 to lend support to the inner ends of the electrically conductive lead-through pins A–E and to lend support to the fragile leads connecting the core windings.

Thus, once the fitting 31 is threaded into place, the exterior ends of the pins A–E constitute one portion of the interface between the preysure sensor circuit enclosed within the vessel and the electronic drive and pulse detector system disposed outside the vessel.

In operating the pressure sensor circuit, the ampere turns applied to the primary winding of each core is proportional to the magnetic field or magnetizing force desired and the level of drive current passing through the coils. The output voltage on the secondary winding of each core is proportional to the flux density generated in each core by the current passing through the primary winding. As pressure is applied to the pressure transducer or core member, the voltage which is induced in the secondary winding decreases as the pressure increases. Therefore, the maximum sensitivity which can be attained with respect to output voltage from the secondary winding occurs when the drive current is of sufficient magnitude to drive the core into a saturated condition. If the drive current is of a lesser value, the pressure transducer will still operate, but since the generated magnetic flux density is less than the maximum possible, the initial voltage output from the secondary winding on each core will be less than maximum, resulting in a decrease in sensitivity.

In operation, the pressure sensor circuits will follow the well-known phenomenom of hysteresis in which a magnetic field alternately increased and decreased in value will result in a hysteresis loop caused by the fact that the flux density decreases at a lesser rate than it increases along the initial magnetization curve. Thus, when the magnetic field reaches a zero value, there is remaining in the core member a residual flux density. To reduce the residual flux density to zero, a negative magnetic field must be applied. This negative magnetic field is called the coersive force. The phenomenom which causes the flux density to lag behind the magnetic field so that the magnetization curve for increasing and decreasing fields is not the same, is called hysteresis and the loop traced by the magnetization curve is called a hysteresis loop. In the present instance, as previously noted, for maximum sensitivity in the detection of pressure variations, it is preferred that the pressure sensor circuit be operated at a drive current level such that the ferrimagnetic cores 4 and 8 are driven to saturation at both ends of the hysteresis loop.

Figure 11:
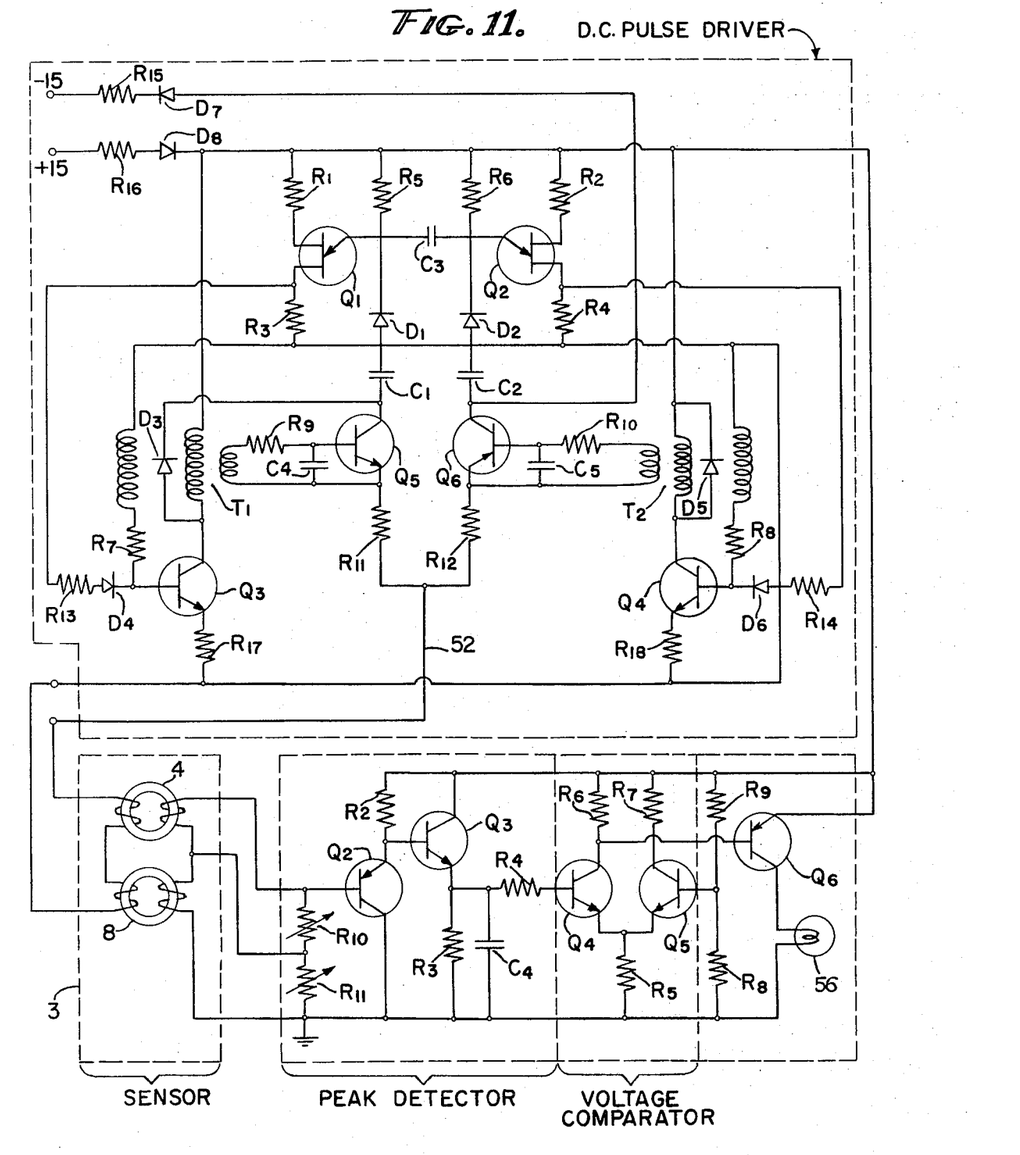
FIG. 11 is a circuit diagram illustrating an AC pulse excitation drive circuit means associated with the detector circuit and voltage comparator circuit.
Figure 15:
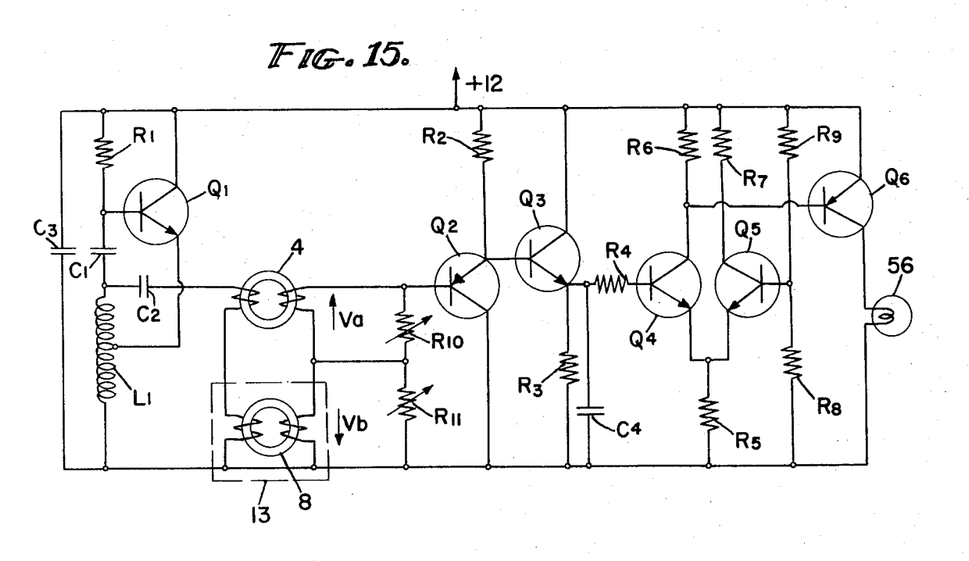
FIG. 15 is a circuit diagram of the pressure sensing and signaling system when the drive means comprises an AC sine wave drive instead of an AC pulse excitation drive.

Referring to FIGS. 11 and 15, it has been found that the current wave form supplied to the primary winding of each core member 4 and 8 must be of the AC type in order to drive the core from the positive state of magnetization to the negative state of magnetization and back again. Many different types of waveforms are useable, but in the interest of brevity, only two, with the associated circuitry necessary to generate them, will be discussed herein. The waveform produced by the circuitry illustrated in FIG. 11 will be an AC pulse excitation waveform having alternately negative and positive going pulses, while the circuitry illustrated in FIG. 15 constitutes an AC sine wave drive.

Figures 13, 14:
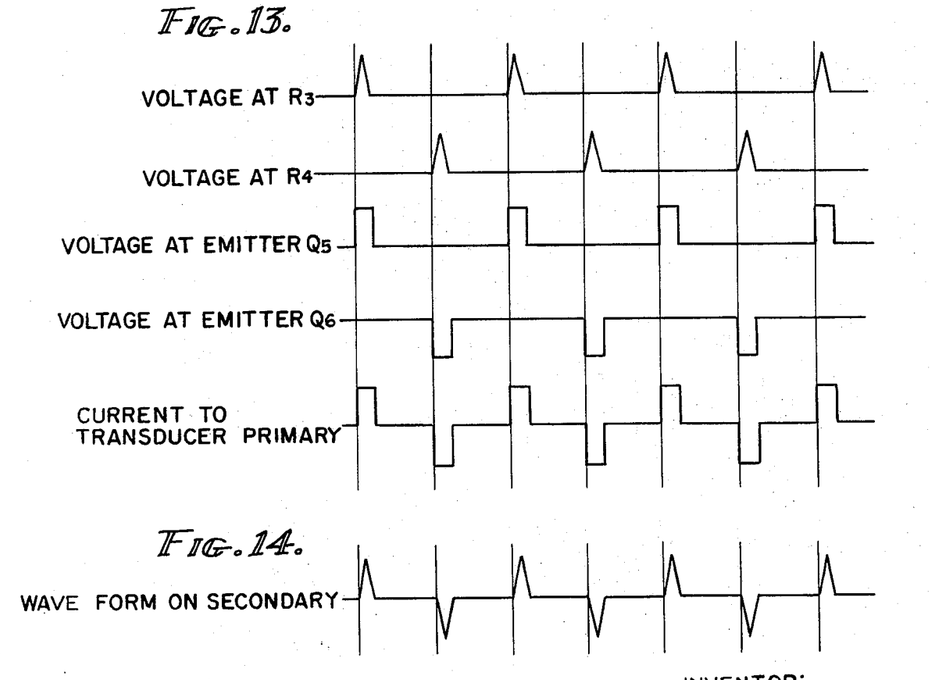
FIG. 13 is a composite view illustrating pulse waveforms at indicated points in the circuitry.
FIG. 14 is a schematic view illustrating the waveform on the secondary winding of the pressure sensor circuit.

Referring to FIG. 11, there is there shown an AC pulse excitation driver designated generally by the numeral 51. The Pulse driver comprises unijunction transistors Q1 and Q2 which, with resistors R1, R2, R3, R4, R5, R6, capacitor C3, and diodes D1 and D2, form an oscillator or pulse generator. For optimum operation with a core member 0.050 inches in diameter, the pulse rise time is preferably 250 nanoseconds. Operation of the pulse generator alternately triggers transistors Q3 and Q4, which constitute part of a blocking oscillator. One blocking oscillator is made up of transistor Q3, resistor R13, diode D4, resistor R7, diode D3, resistor R17, and transformer T1. The other blocking oscillator is made up of transistor Q4, resistor R14, diode D6, resistor R8, diode D5, resistor R18 and transformer T2. In operation, the blocking oscillators alternately turn on output transistors Q5 and Q6 to send positive and negative going current pulses to the sensor primary winding through lead 52. As illustrated in FIG. 13, the voltage developed across resistors R3 and R4 controls the time at which Q5 and Q6 are turned on and off. Unijunction transistors Q1 and Q2, along with transistors Q3, Q4, Q5 and Q6 are digital in their performance in that they are either on or off. FIG. 13 thus illustrates the timing in the circuit, which is not analog in nature. Application of such positive and negative going pulses to the primary windings of cores 4 and 8 results in voltage pulses being induced in the secondary winding of each of the core members 4 and 8 as illustrated in FIG. 14.

An alternate means for driving the pressure sensor circuit is illustrated in FIG. 15. As previously discussed, the current waveforms applied to the primary windings of cores 4 and 8 must be of the AC type in order to drive the cores from the positive state of magnetization to the negative state of magnetization and back again. The drive means illustrated in the top half of FIG. 11 constitutes an AC pulse excitation driver, while the circuit illustrated in FIG. 15 constitutes an AC sine wave drive means. The peak detector and voltage comparator circuits illustrated in the bottom half of FIG. 11 are the same whether an AC pulse excitation driver is utilized or an AC sign wave drive is used. Accordingly, discussion of the peak detector and voltage comparator circuit will be described in conjunction with the AC sine wave drive means illustrated in FIG. 15.

As there shown, the AC sine wave drive circuit drives the two ferrimagnetic core members 4 and 8 which as before are wound in series opposition. As previously discussed, core 4 is exposed to both the temperature and pressure within the pressure vessel, while core 8 is isolated from the pressure within the vessel and is exposed only to ambient temperature. Thermal compensation is achieved by this method and will be discussed in detail hereinafter.

Referring specifically to FIG. 15, the circuit elements Q1, R1, C1, C2, C3, and L1 constitute a Hartley oscillator, with ferrimagnetic core members 4 and 8 interposed in series with the tank circuit. Since the secondary windings of the ferrimagnetic core members 4 and 8 are in series opposition, the total voltage applied to the base of transistor Q2 ($Va-Vb$) is zero. As pressure is applied, voltage $Va$ becomes less and the voltage at the transistor Q2 base terminal is no longer zero. The transistor pair Q2 and Q3 are arranged as an emitter follower and are used to charge the integrating capacitor C4.

The combination of transistor pair Q4 and Q5 function as a voltage comparator circuit. If the voltage at the base of Q4 exceeds the reference voltage (determined by resistors R8 and R9) then transistor Q5 will conduct, causing transistor Q6 to conduct, which in turn will light the warning lamp 56.

To summarize, the pressure vessel is pressurized to its initial preferred system pressure of approximately 3,500 psi. This amount of pressure causes the voltage Va from the secondary winding of ferrimagnetic core member 4 to be less than the voltage Vb from the ferrimagnetic core member 8. The magnitude of the differential voltage Va-Vb is some positive value Vc. If the pressure within the pressurized vessel decreases to some predetermined lower pressure, the differential voltage Va-Vb also drops to some lower voltage Vd (where Vd is less than Vc). The reference voltage determined by resistors R8 and R9 is set for the voltage limitation Vd. It will thus appear that if the voltage differential Va-Vb is less than Vd, transistors Q5 and Q6 are switched to a conducting condition, thus lighting the warning lamp 56.

As previously discussed, by using ferrimagnetic core members 4 and 8 in series opposition, a correction for error due to temperature variation is attained. As temperature is varied, Va and Vb vary together, thus keeping the base terminal of transistor Q2 at zero voltage with respect to temperature. Temperature drift is therefore effectively cancelled. In this regard it should be noted that such temperature compensation occurs over the entire pressure range, and regardless of how the temperature variation is induced in the system. Thus, for example, the system is adapted to possess a normal pressure of 3,500 psi, with the warning being given at 3,000 psi, i.e., by a drop in pressure of 500 psi., at normal temperature of say 68° F., the same drop in pressure (500 psi.) should be required to activate the warning when the pressure within the vessel drops to say 2,500 psi. because of a drop in temperature. In this example, for instance, if the pressure dropped to 2,500 psi. because of a reduction in temperature, the warning would be activated at 2,000 psi. Stated another way, the diminution in pressure in pounds per square inch effective to activate the warning should remain constant irrespective of variations in pressure due to temperature variations.

Figure 12:
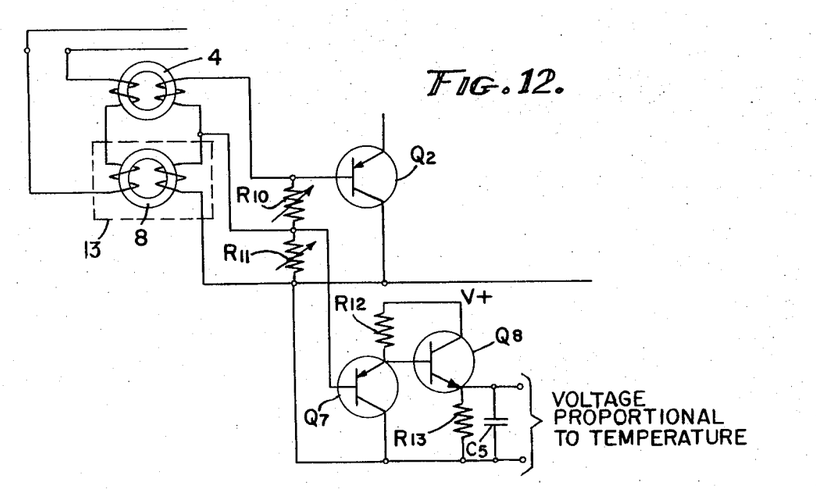
FIG. 12 is a circuit diagram showing how the circuit illustrated in FIG. 11 may be modified to provide an output voltage from the system that is proportional to the ambient temperature. Except for the additional components illustrated in FIG. 12, the circuit illustrated in FIG. 11 remains the same.

In some instances, it may be desirable to generate a voltage function for varying temperature. This can be accomplished through the use of variable resistors R10 and R11 and the additional components illustrated in FIG. 12. Satisfactory results have been achieved with components having the following values:

Q7 = 2N3906 Transistor
Q8 = 2N3904
R12 = 22K
R13 = 1K
C5 = 0.01 $\mu$F

For example, in the safety system described, fluid under high pressure is stored in a pressure vessel. The pressure in the vessel varies as a function of temperature. This pressure variation would be sensed by ferrimagnetic core member 4, and the voltage at the base terminal of transistor Q2 would be off zero. If it is desired to keep the voltage variation at the base terminal of Q2 zero as the pressure vessel is exposed to temperature, resistors R10 or R11 or both can be properly adjusted. In this way, the pressure variation due to the pressure vessel being exposed to a varying temperature can be compensated manually. To automatically secure a voltage function proportional to such temperature variations, the additional circuit components illustrated in FIG. 12 are incorporated into the basic circuit. As there shown, by virtue of the isolation of ferrimagnetic core member 8, only ferrimagnetic core member 4 is subjected to pressure within the pressure vessel. Core member 8, however, is subjected to temperature changes. Since the secondary voltage Vb of core member 8 will vary with temperature, it only requires that this voltage be peak detected by the circuit comprised of resistors R12 and R13 and capacitor C5, and transistors Q7 and Q8. The output voltage at the emitter of transistor Q8 will thus be proportional to temperature and can be so used as a temperature indicator.

Illustrative of the components making up the AC pulse excitation driver illustrated diagrammatically in FIG. 11, it has been found that satisfactory results are secured with the following components:

AC PULSE EXCITATION DRIVER

FIG. 11

| Nomenclature | | |
|---|---|---|
| Q1, Q2 | Uni-Junction Transistor | 2N4851 |
| Q3, Q4 | NPN Transistor | 2N3904 |
| Q5 | NPN Transistor | 2N4911 |
| Q6 | PNP Transistor | 2N4899 |
| D1, D2, D3, D4, D5, D6 | Diode | 1N914 |
| D7, D8 | Diode | 1N4002 |
| R1, R2 | 470 1/4 W 5% Carbon Res. | |
| R3, R4 | 47 1/4 W 5% Carbon Res. | |
| R5, R6 | 10K 1/4W 5% Carbon Res. | |
| R7, R8 | 1.5K 1/4W 5% Carbon Res. | |
| R9, R10 | 22 1/4W 5% Carbon Res. | |
| R11, R12 | 10 1/4W 5% Carbon Res. | |
| R13, R14 | 1K 1/4W 5% Carbon Res. | |
| R15, R16, R17, R18 | 20 1/4W 5% Carbon Res. 51 1/4W 5% Carbon Res. | |
| C1, C2 | 200/25 Capacitor, Electrolytic | 39D207G025EJ4 |
| C3 | 0.01/100 Capacitor Ceramic | TG-S10 |
| C4, C5 (Select) | 0.005/100 Capacitor Ceramic | TG-D50 |
| | 0.01/100 Capacitor Ceramic | TG-S10 |
| | 0.02/100 Capacitor Ceramic | TG-S20 |
| | 0.025/100 Capacitor Ceramic | TG-S25 |
| T1, T1 | Transformer, Pulse | PE-4215 |

Illustrative of the components forming a satisfactory circuitry for the AC sine wave drive, and for the detector and comparator circuits illustrated in FIGS. 11 and 15, are the following:

R1 = 82 — 2 watts
C1 = 0.001 $\mu$fd
C2 = 0.01 $\mu$fd
L1 = 22 microhenries
C3 = 10 $\mu$fd
Q1 = 2N2102 Transistor (RCA)
R2 = 22K
R3 = 1K
C4 = 0.01 ufd
R4 = 1K
R5 = 47
R6 = 470
R7 = 470
R8 = 1K
R9 = 11K
Q2 = 2N3906 Transistor (motorola)
Q3, Q4, Q5 = 2N3904 Transistor (Motorola)

Q6 = 2n2102
L1 = 12 volt lamp
R10, R11 = 1K (Variable)

From the foregoing, it will be apparent that the peak detector voltage comparator circuit illustrated in the lower half of FIG. 11 in conjunction with the AC pulse excitation drive means, is essentially the same as the peak detector in voltage comparator circuit illustrated in FIG. 15. Accordingly, in the interest of brevity, the discussion above in connection with FIG. 15, and the components there described, apply with respect to the peak detector and voltage comparator circuit illustrated in the lower half of FIG. 11.

Having thus described my invention, what is claimed to be novel and sought to be protected by letters patent, is as follows:

I claim:

1. A pressure sensing and indicating system for use in conjunction with a vessel pressurized to an initial pressure with a fluid medium and operative to signal pressure within the vessel, comprising:
    A. a pressure sensor circuit including a pair of transducers having electrical input and output terminals for providing an output signal mounted to respond to variations in pressure in said vessel;
    b. drive circuit means connected to the input of said pressure sensor circuit and operative to alternately generate positive and negative pulses at the input of said pressure sensor circuit;
    c. detector circuit means connected to the output terminals of said pressure sensor circuit to detect the amplitude of the output signal pulses at the output terminals of the pressure sensor circuit;
    d. voltage comparator circuit means connected to said detector circuit means and operative to compare the amplitude of pulses emanating from said detector circuit means with a predetermined reference voltage; and
    e. means activated by a reduction in the amplitude of the output signal below said predetermined value to warn an observer that the pressure in the vessel has dropped below a selected pressure,
    f. each of said transducers including a magnetostrictive core toroidal in configuration and primary and secondary windings wound on said cores in series opposition, one of said cores being responsive to variation in pressure of said fluid medium and the other core being responsive to variations in temperature of said fluid medium and non-responsive to variations in pressure, whereby a variation in amplitude of the output signal caused by a variation in pressure due to temperature variations is compensated by a variation in amplitude of the output signal caused by said variation in temperature.

2. The combination according to claim 1, in which said pressure sensor circuit is included in the tank circuit of said AC drive circuit.

3. A pressure sensing and indicating system for use in conjunction with a vessel pressurized to an initial pressure with a fluid medium and operative to signal pressure within the vessel, comprising: a pressure sensor circuit including a pair of transducers each of said transducers including a magnetostrictive core toroidal in configuration and primary and secondary windings wound on said cores in series opposition, one of said cores being responsive to variations in temperature of said fluid medium and non-responsive to variations in pressure, whereby a variation in amplitude of the output signal caused by a variation in pressure due to temperature variations is compensated by a variation in amplitude of the output signal caused by said variation in temperature and means activated by a reduction in the amplitude of said output signal below a predetermined value to warn an observer that the pressure in the vessel has dropped below a selected pressure.

* * * * *